2,709,882
Patented June 7, 1955

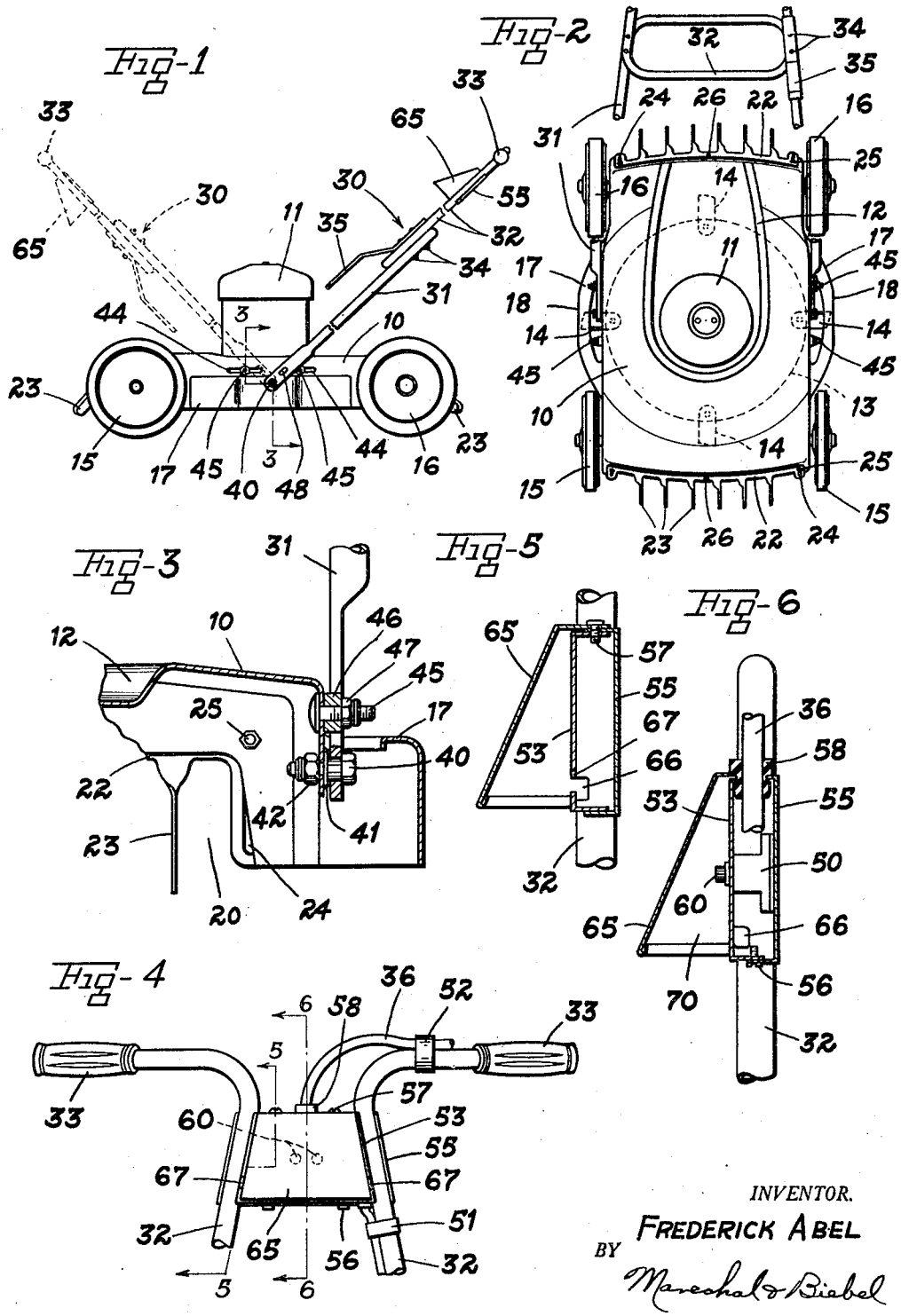

2,709,882

LAWN MOWER CONTROL APPARATUS

Frederick Abel, Dayton, Ohio, assignor to The Huffman Manufacturing Company, Dayton, Ohio, a corporation of Ohio Application April 20, 1951, Serial No. 221,991

2 Claims. (Cl. 56—25.4)

This invention relates to power lawn mowers and more particularly to rotary power lawn mowers of the type wherein a cutting disk or knife member is supported for rotation on a vertical axis.

The invention has special relation to lawn mowers of this rotary type having an electric motor for driving the cutting member which is provided with a length of electric cord for connection to a suitable receptacle to supply operating current for the motor. For convenience in use, it is desirable to have a control switch positioned for ready operation by the user, a suitable location being on the handle of the mower. However, since the lawn mower may be used in all kinds of weather, it is important to prevent penetration of the switch by moisture from rain which could cause short circuiting, especially if the moisture has free access to the necessary opening in the switch cover for receiving a button or other switch operating member, and this is particularly true where the handle is pivoted or otherwise adjustably mounted on the lawn mower for operation in different angular positions.

It is accordingly one of the principal objects of the present invention to provide an electrically operated lawn mower of the rotary type having a control switch which is located in exposed position on the handle for ready operation to start and stop the motor and which includes a shield member arranged to shield the switch against rain, particularly in the vicinity of the switch button, while still affording ready access to the switch button for starting and stopping the motor.

Another object of the invention is to provide a lawn mower of the rotary type which is arranged for operation when moving either forwards or backwards with equal efficacy, which includes a handle mounted for swinging movement between positions at the front and back of the casing for guiding the lawn mower either forwards or backwards, and which includes an operating switch on the handle having a rain shield of such construction and arrangement thereon as to shield the switch against rain in all operating positions of the handle while still affording ready access to the switch for starting and stopping the motor.

It is also an object of the invention to provide a lawn mower of the rotary type which is constructed for cutting operation when moving either forwards or backwards, which includes a handle pivoted thereon for swinging movement between positions at the front and back of the casing for guiding the mower either forwards or backwards, and which also includes adjustable stops which establish limit positions of the handle at either side of center for convenient operation and which also serve as fulcrum points for the handle to aid in the maneuverability of the mower.

Other objects and advantages of the invention will be apparent from the following description, the accompanying drawing and the appended claims.

In the drawing—

Fig. 1 is a view in side elevation showing an electric rotary lawn mower constructed in accordance with the invention;

Fig. 2 is a top view of the mower with the handle partly broken away;

Fig. 3 is an enlarged fragmentary section on the line 3—3 of Fig. 1 showing the adjustable pivotal connection of the handle to the mower casing;

Fig. 4 is an enlarged fragmentary front elevational view of the top part of the handle of the mower showing the control switch and rain shield; and Figs. 5 and 6 are enlarged sections on the lines 5—5 and 6—6 respectively of Fig. 4 showing the control switch and rain shield of the mower.

Referring to the drawing, which illustrates a preferred embodiment of the invention, the lawn mower includes a main body casing 10 formed of sheet metal on which is mounted an electric motor 11 having its axis arranged vertically, and the top of the casing is provided with a recessed or trough portion 12 for increased rigidity. The cutting means of the mower includes a blade disk 13 supported within casing 10 on the shaft of motor 11 for rotation above the ground and carrying a plurality of blades 14 for cutting the grass as the disk rotates. The casing 10 is supported by a pair of front wheels 15 and a pair of rear wheels 16, and on each side between the wheels, the casing 10 is provided with a side member 17 of sheet metal which is curved concentrically with the axis of disk 12 except for short flat portions 18, this particular shape of the side members 17 having been found effective in obtaining uniform distribution of the cut grass.

At each end, the casing 10 is cut away at 20 to provide openings for substantially unobstructed passage of grass to the cutting disk 13 upon both forward and backward movement of the mower. A guard 22 having multiple tines 23 is mounted for vertical adjustment at each end of the casing to prevent the passage through openings 20 of sticks, stones or the like capable of damaging the cutting disk or blades. As shown, each guard 22 is formed of a single piece of sheet metal and is provided with slots 24 at each end for adjustably receiving mounting bolts 25. At its center, each guard 22 is formed with an opening in its upper edge to receive a center mounting bolt 26.

A handle 30 is provided for guiding the mower. It includes a generally U-shaped lower portion 31 of tube stock which is pivoted at its lower ends to the casing 10, and an upper portion 32 turned outwardly at its upper ends and provided with hand grips 33. The handle portions 31 and 32 are bolted together at 34 for convenience in packaging and shipping, and the bolts 34 also serve to mount on the handle a hook 35 on which the electric cord 36 may be looped for convenient storage.

The pivotal connection of the handle 30 to casing 10 includes a pair of shouldered bolts 40 each extending through the side of casing 10 and provided with a washer 41 and lock nut 42. In addition, adjustable stops are provided for establishing inclined limit positions of the handle on each side of center of the casing. As shown, the casing 10 is formed with a pair of longitudinally extending slots 44 above and on each side of center of the pivot bolts 40. In each slot 44 is mounted a carriage bolt 45 provided with a stop spacer 46 and a lock nut 47. The stop spacers 46 are arranged for contact with the handle portion 31 as the latter pivots on bolts 40 to limit this swinging movement of the handles, and the bolts 45 may be readily adjusted lengthwise of slots 44 as desired to alter these limit positions of the handle.

Provision is also made for locking the handle in fixed position with respect to the casing if desired. As shown in Fig. 1, an elongated opening 48 is provided in the handle in such position as to overlie one or the other pair of slots 44 in the operating positions of the handle. The handle and casing may therefore be readily bolted together through the openings 48 and coincident slots 44, for example by using the bolts, spacers and nuts not being used as stops for the handle, namely the stop bolts 45 at the front of the casing in Fig. 1 if the handle is to be fixed in the position shown therein in full lines.

The switch 50 for stopping and starting the motor 11 is mounted on handle 30, and the cord 36 is guided to the switch by means of a clip 51 and a flexible rubber loop 52 permitting relative movement between the cord and handle without subjecting the cord to complete confinement, which might result in hardening and embrittlement of the conductors therein. The switch 50 is supported on a web 53 welded between the handle portions 32 and forming a mounting plate and front cover for the switch. The switch cover 55 at the back of the handle is screwed at 56 and 57 to the web 53. The web 53 and housing 55 thus cooperate to enclose the switch 50, with the web 53 forming the front part of the switch housing, and a plastic strain relief bushing 58 is provided at the top of the switch housing to close the point of entry of the cord 36 and to prevent strain from being transmitted through the cord to the switch terminals.

The start and stop buttons 60 for switch 50 are located at the front of the switch and extend through holes in the web 53 as shown in Fig. 5. In order to protect the switch against rain, particularly in the vicinity of the buttons 60 a shield 65 is provided which is formed of sheet metal in hood-like shape to extend above the switch cover 55 and outwardly and downwardly in overhanging relation with the front of the switch and the buttons 60 to shield the switch against rain in all angular positions of the handle. The shield 65 is readily mounted in position by means of tab portions 66 which are received through slots 67 at opposite sides of the web 53, and the top portion of the shield 65 is secured to the web 53 and cover 55 by bolts 57. At the same time, the shield is open in its underside at 70 to provide ready access for the operator to the buttons 60.

This construction and arrangement of the handle and switch afford substantial practical advantages in the use of the lawn mower. Since the mower will operate equally well whether moving forwards or backwards, it is unnecessary to turn it completely around in cutting back and forth across an area, and instead the handle may merely be swung between its limit positions. Furthermore, the limit positions can be adjusted as desired for the comfort of the individual user, and in all operating positions the control switch is effectively shielded against rain to permit free and safe use of the mower even in bad weather without danger of short circuiting.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Control apparatus for use with a power lawn mower having a casing provided with supporting wheels, cutting means supported by said casing for rotation on a vertical axis above the ground and an electric motor carried by said casing for driving said cutting means, comprising a handle for guiding said lawn mower, means forming a pivotal connection for said handle on said casing for swinging movement thereof between positions at the front and back of said casing respectively providing for operating said lawn mower either forwards or backwards, a control switch for said motor carried by said handle, a cover for said switch carried by said handle and including a shield overhanging said switch to shield the same against rain in all positions of said handle, an electric cord leading from said switch for attachment to a source of supply current, and flexible loop means embracing said cord and a portion of said handle spaced from said shield and providing for limited movement of said cord with respect to said handle to prevent hardening and embrittlement of the conductors therein.

2. Control apparatus for use with a power lawn mower having a casing provided with supporting wheels, cutting means supported by said casing for rotation on a vertical axis above the ground, an electric motor carried by said casing for driving said cutting means and a handle for guiding said lawn mower, comprising a control switch for said motor carried by said handle, a cover for said switch mounted on said handle, an electric cord leading from said switch for attachment to a source of supply current, said cover having an opening therein for receiving said cord therethrough, a bushing enclosing said cord and received in said opening for closing the point of entry of said cord to said cover and preventing transmission of strain through said cord to said switch, and a flexible loop embracing said cord and a portion of said handle spaced from said cover to provide for limited movement of said cord with respect to said handle and said bushing for preventing hardening and embrittlement of the conductors therein.

References Cited in the file of this patent

UNITED STATES PATENTS

| Re. 18,944 | Beazley | Sept. 12, 1933 |
| 843,770 | Ru Ton | Feb. 12, 1907 |
| 1,042,193 | Bowling | Oct. 22, 1912 |
| 1,876,504 | Rossiter et al. | Sept. 6, 1932 |
| 2,167,222 | Shelor | July 25, 1939 |
| 2,480,944 | Maipass | Sept. 6, 1949 |
| 2,485,729 | Gentry | Oct. 25, 1940 |
| 2,561,293 | Ross | July 17, 1951 |
| 2,578,880 | Doyle | Dec. 18, 1951 |
| 2,643,502 | Flanigan | June 30, 1953 |

FOREIGN PATENTS

| 169,326 | Great Britain | Sept. 29, 1921 |
| 400,652 | Italy | Dec. 18, 1942 |
| 418,607 | Italy | Feb. 24, 1947 |